United States Patent
Landgrebe et al.

(10) Patent No.: US 12,450,964 B2
(45) Date of Patent: Oct. 21, 2025

(54) DISORDERLY BIOMETRIC BOARDING

(71) Applicant: Amadeus S.A.S., Biot (FR)

(72) Inventors: Thomas Christopher Wolfgang Landgrebe, Sydney (AU); Peter Horsley, Wahroonga (AU)

(73) Assignee: AMADEUS S.A.S., Biot (FR)

( * ) Notice: Subject to any disclaimer, the term of this patent is extended or adjusted under 35 U.S.C. 154(b) by 185 days.

(21) Appl. No.: 18/270,857

(22) PCT Filed: Mar. 8, 2021

(86) PCT No.: PCT/EP2021/055773
§ 371 (c)(1),
(2) Date: Jul. 4, 2023

(87) PCT Pub. No.: WO2022/148554
PCT Pub. Date: Jul. 14, 2022

(65) Prior Publication Data
US 2024/0071155 A1     Feb. 29, 2024

(30) Foreign Application Priority Data
Jan. 6, 2021   (EP) .................................. 21305013

(51) Int. Cl.
*G07C 9/00*     (2020.01)
*G06T 7/20*     (2017.01)
(Continued)

(52) U.S. Cl.
CPC ............ *G07C 9/00563* (2013.01); *G06T 7/20* (2013.01); *G06V 10/62* (2022.01); *G06V 20/52* (2022.01);
(Continued)

(58) Field of Classification Search
CPC .................. G07C 9/00563; G06T 7/20; G06T 2207/30201; G06T 2207/30232;
(Continued)

(56) References Cited

U.S. PATENT DOCUMENTS 9,922,237 B2 *  3/2018  Li ......................... G06V 40/172
9,984,290 B2 *  5/2018  Hanna .................... G06V 40/40
(Continued)

FOREIGN PATENT DOCUMENTS

CN    111508124 A    8/2020
EP     2620896 A2    7/2013
(Continued)

OTHER PUBLICATIONS

Baltieri, Davide, et al. "Multi-view people surveillance using 3D information." 2011 IEEE International Conference on Computer Vision Workshops (ICCV Workshops). IEEE, 2011.
(Continued)

*Primary Examiner* — Nam V Nguyen
(74) *Attorney, Agent, or Firm* — Perry +Currier Inc.

(57) ABSTRACT

Disclosed is a method for controlling access for at least one tracked object, including: acquiring or receiving a series of two-dimensional images assumed to be taken of the at least one tracked object, and also position data in respect of the at least one tracked object; assigning a unique tracking identifier to the at least one tracked object; determining a trajectory of the at least one tracked object from the position data; determining if there is a discontinuity in the trajectory or data computed from the trajectory, and if a discontinuity is detected, acquiring or receiving one or more new images of the at least tracked object, and assigning a new unique tracking identifier to said at least one tracked object; and determining whether access should be allowed, on the basis of at least one of the one or more new images if discontinuity
(Continued)

is detected, or on the basis of the at least one image from the series of two-dimensional images if discontinuity is not detected.

17 Claims, 6 Drawing Sheets

(51) Int. Cl.
  *G06V 10/62* (2022.01)
  *G06V 20/52* (2022.01)
  *G06V 40/16* (2022.01)
(52) U.S. Cl.
  CPC .......... *G06V 40/161* (2022.01); *G06V 40/172* (2022.01); *G06T 2207/30201* (2013.01); *G06T 2207/30232* (2013.01)
(58) Field of Classification Search
  CPC ...... G06V 10/62; G06V 20/52; G06V 40/161; G06V 40/172
  USPC ....................................................... 340/5.53
  See application file for complete search history.

(56) References Cited

U.S. PATENT DOCUMENTS

| | | | | |
|---|---|---|---|---|
| 10,146,797 B2* | 12/2018 | Bataller | ............... | G06V 40/172 |
| 10,296,860 B2* | 5/2019 | Agrawal | ............... | G06V 20/59 |
| 11,037,303 B2* | 6/2021 | Li | ............... | G06T 7/215 |
| 11,232,183 B2* | 1/2022 | Cornick | ............... | G07C 9/28 |
| 2011/0199461 A1* | 8/2011 | Horio | ............... | G06T 7/20 |
| | | | | 348/46 |
| 2013/0195316 A1 | 8/2013 | Bataller et al. | | |
| 2024/0070557 A1* | 2/2024 | Watanabe | ............... | G06Q 10/02 |

FOREIGN PATENT DOCUMENTS

| | | |
|---|---|---|
| GB | 2508743 A | 6/2014 |
| JP | 2006177086 A | 7/2006 |
| JP | 2006236260 A | 9/2006 |
| JP | 201325523 A | 2/2013 |
| JP | 202096262 A | 6/2020 |

OTHER PUBLICATIONS

Koopmanschap, Raymond et al. "Multiple face detection and tracking under occlusion.", Report No., CST 2017 078, Eindhoven University of Technology, Jul. 7, 2017.

Anonymous,"Multiple Object Tracking", MathWorks, Apr. 13, 2016, URL: www.mathworks.com/help/vision/ug/multiple-object-tracking. html. Retrieved from the Internet on Sep. 8, 2017 from https://web.archive.org/web/20160413115204/https://de.mathworks.com/help/vision/ug/multiple-object-tracking.html.

* cited by examiner

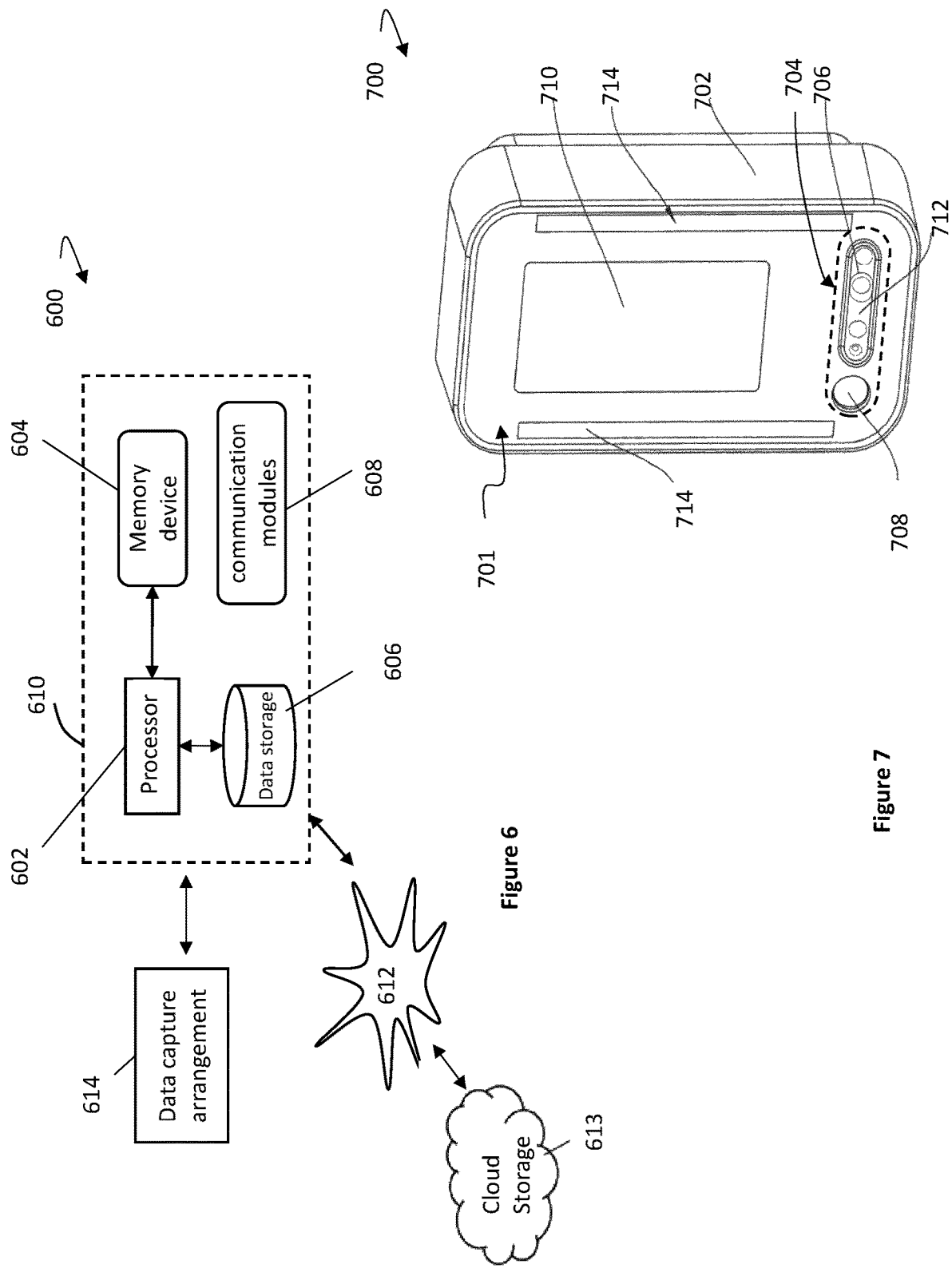

DISORDERLY BIOMETRIC BOARDING

TECHNICAL FIELD

This disclosure relates to biometric boarding. In particular, it relates to improvements in the assignment of passenger identifiers so as to facilitate boarding of passengers that is not limited to a strict orderly process.

BACKGROUND ART

Biometric boarding typically involves an orderly process, whereby passengers are in a single-file line. Passengers are photographed one-by-one in an orderly queue and their photographs are compared with a database of authorised passengers. In an orderly queue, spacing between passengers is often maintained by airport staff, or by the passengers adhering to instruction from staff or signage.

When two passengers in the queue stand too close to each other, the face capturing algorithm of the biometric identification system from time to time becomes confused, whereby it attempts to assign the same identifier to both passengers. When the first passenger has been boarded, the matching system becomes unable to match the second passenger to valid boarding data. Although the aforementioned confusion does not always occur, when it does occur, it leads to what is known as a process exception, and introduces significant delays to the overall boarding process.

Therefore, the queue spacing needs to be maintained at a large enough distance to avoid the boarding system confusing the "target" passenger identity with that of another passenger who has already been boarded. However, requiring spacing between queueing passengers can easily double boarding time. In most circumstances it also requires significant manual effort by staff to maintain the process.

Therefore, in existing orderly biometric boarding processes, the process efficiency which can be achieved is constrained by the sophistication of the capture technology, and the efficiency to which airline staff and signage are able to overcome unexpected or undesirable passenger behaviour. The further apart passengers are required to be spaced, the slower the boarding process will be.

All known biometric boarding systems are subject to these same limitations, especially due to their inability to distinguish close and far faces (face area is not accurate due to variations in age or population), as well as the lack of identity tracking through time (a person looking away from the camera for an instant could be superseded by a person behind them looking at camera).

Ideally, disorderly boarding (still single-file) would minimise transaction time (no walking time delays) and increase automation (less requirement for strict boarding processes and well-trained agents). Colloquially, this issue is known as the "stacking problem" i.e. biometrically coping with a queue of passengers where they tend to stand too close to one another and "stack up".

To avoid identification issues, some vendors resort to placing biometric cameras at a right angle with respect to the queue direction so that passengers turn one-by-one to face the camera or are more likely to appear before the camera one at a time. However, this placement is suboptimal for biometric capturing as passengers will align themselves with such a camera with more difficulty than with a camera aligned with their direction of motion. This results in significant processing delays as the target passenger positions themselves at an angle to the passenger flow.

One solution is to incorporate a three-dimensional (3D) camera, to obtain "depth" data, i.e., the distance between a passenger whose face has been captured and the 3D camera. The face capture system can, for example, disregard any faces that are outside of a certain distance threshold. However, this solution still requires a certain distance between the passengers to be maintained in order to minimise the stacking problems.

Solutions that further minimise the stacking problem are desired. It is to be understood that, if any prior art is referred to herein, such reference does not constitute an admission that the prior art forms a part of the common general knowledge in the art, in Australia or any other country.

SUMMARY

In one aspect, there is disclosed a method for controlling access for at least one tracked object, including: acquiring or receiving a series of two-dimensional images assumed to be taken of the at least one tracked object, and also position data in respect of the at least one tracked object; assigning a unique tracking identifier to the at least tracked object; providing a trajectory of the at least one tracked object from the position data; determining if there is a discontinuity in the trajectory or data computed from the trajectory, and if a discontinuity is detected, acquiring or receiving one or more new images of the at least one tracked object, and assigning a new unique tracking identifier to the at least one tracked object; and determining whether access should be allowed, on the basis of at least one of the one or more new images if discontinuity is detected, or on the basis of at least one image from the series of two-dimensional images if discontinuity is not detected.

In some forms, the step of determining if there is discontinuity comprises determining if a distance discontinuity condition or a velocity discontinuity condition is met by a time series of distance data or velocity data obtained from the trajectory.

In some forms, the discontinuity condition is whether a difference between two data samples in the time series: 1) exceeds a threshold value, or 2) exceeds or equals a threshold value.

In some forms, the threshold at least in part depends on an elapsed time between times at which the two data samples were acquired.

In some forms, the method further comprises: providing a time series of a statistic or metric computed from the trajectory or the two-dimensional images, and determining whether a statistic or metric discontinuity condition is met by the times series of statistics or metrics.

In some forms, the method further comprises checking whether the statistic or metric discontinuity condition is met before determining if there is a discontinuity in the trajectory or data computed from the trajectory.

The method mentioned above may be a biometric access control method. The biometric access control method may further be a facial biometric control method, wherein said at least one tracked object is a facial area of a person. The statistic or metric may be a facial area size or a biometric score computed from the two-dimensional images.

In some forms, the method includes applying an object detection algorithm to a three-dimensional image to detect one or more objects, each object being said one of said at least one tracked object.

In some forms, the position data comprises at least a depth data.

In a second aspect, there is disclosed a method for counting a number of times a passage past a checkpoint by one or more tracked objects has occurred. The method includes processing a passage by each tracked object and admitting passage by the tracked object. The processing for each tracked object includes: acquiring or receiving a series of two-dimensional images assumed to be taken of the tracked object, and also position data in respect of the tracked object; assigning a unique tracking identifier to the tracked object; determining a trajectory of the tracked object from the position data; and determining if there is a discontinuity in the trajectory or data computed from the trajectory, and if a discontinuity is detected, assigning a new unique tracking identifier to one or more new images acquired of the tracked object. Determining the number of times passage past the check point has occurred includes determining the number of different unique tracking identifiers which have been assigned.

In some forms, the admitting passage includes determining whether access should be allowed on the basis of the new unique tracking identifier and at least one of the one or more new images if discontinuity is detected, or on the basis of the existing tracking identifier and at least one image from the series of two-dimensional images if discontinuity is not detected. In the determining of the number of times passage past the check point has occurred, only the tracking identifiers which are assigned to tracked objects who are admitted passage are counted.

In a third aspect, disclosed is a method for tracking a count for a number of times a passage past a checkpoint by one or more tracked objects has occurred. The method includes: acquiring or receiving a series of two-dimensional images assumed to be taken of each tracked object, and also position data in respect of the tracked object; assigning a unique tracking identifier to the tracked object; determining a trajectory of the tracked object from the position data; determining if there is a discontinuity in the trajectory or data computed from the trajectory, and if a discontinuity is detected, acquiring or receiving one or more new images acquired of the tracked object, and assigning a new unique tracking identifier to the tracked object; determining whether passage should be allowed, on the basis of at least one of the one or more new images if discontinuity is detected, or on the basis of the at least one image from the series of two-dimensional images if discontinuity is not detected; and increasing the count if passage is determined to be allowed.

In a fourth aspect, disclosed is a method of controlling or monitoring access to a premise or mode of transport having one or more entry points, or one or more exit points, or both, including implementing the method of the first or second aspects as mentioned above, at each entry point, at each exit point, or both.

In a fifth aspect, disclosed is a biometric access control method, comprising the method mentioned in any of the aspects above.

The method may be a facial biometric access control method, wherein the tracked object is a facial area of a person, for example in the form of a passenger wanting access to a travel vehicle.

The statistic or metric may be a facial area or a biometric score computed from the two-dimensional images.

The method may include applying an object detection algorithm to a three-dimensional image to detect one or more objects, each object being the tracked object.

In a sixth aspect, disclosed is a computer readable medium having stored thereon machine readable instructions, which when executed are adapted to perform the method in accordance with any of the aspects mentioned above.

In a seventh aspect, disclosed is an access control system including a processor configured to execute machine readable instructions, which when executed are adapted to perform the method in accordance with any of the aspects mentioned above.

In some forms, the system includes an image capture arrangement, the arrangement including a two-dimensional camera and a three-dimensional camera.

In use, the image capture arrangement may be positioned directly in front of a queue of subjects to be processed by the access control system.

The access control system may be a biometric boarding system.

In a seventh aspect, disclosed is a method of controlling or monitoring access by one or more subjects who are standing in a queue, by using a biometric access control system to process each subject in turn, wherein the biometric access control system includes an image capturing arrangement which faces directly toward a direction of the queue. The biometric access control system provided can be in accordance with the sixth aspect mentioned above.

BRIEF DESCRIPTION OF THE DRAWINGS

Embodiments will now be described by way of example only, with reference to the accompanying drawings in which

FIG. 3(2) is an example of a times series of the calculated facial area size of a tracked object, containing a discontinuity;

FIG. 6 schematically depicts a biometric boarding device;

FIG. 7 shows a perspective view an example "pod" type boarding device;

DETAILED DESCRIPTION

Figure 2:
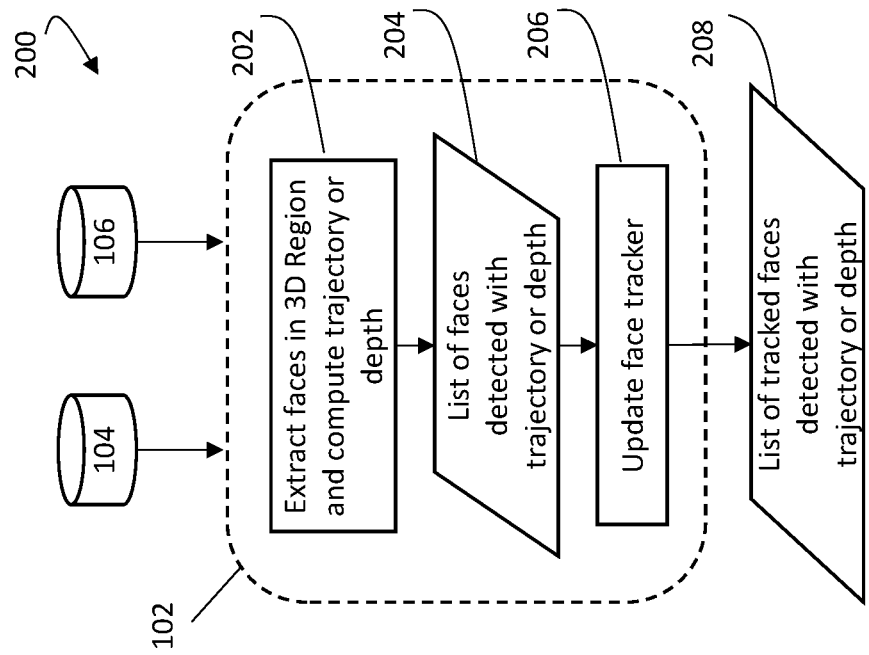
FIG. 2 is a schematic representation of an example process for generating trajectories from tracked lists to be analysed.

In the following detailed description, reference is made to accompanying drawings which form a part of the detailed description. The illustrative embodiments described in the detailed description, depicted in the drawings, are not intended to be limiting. Other embodiments may be utilised and other changes may be made without departing from the spirit or scope of the subject matter presented. It will be readily understood that the aspects of the present disclosure, as generally described herein and illustrated in the drawings, can be arranged, substituted, combined, separated and designed in a wide variety of different configurations, all of which are contemplated in this disclosure.

The aspects of the invention disclosed herein may be utilised in biometric boarding of passengers to an aircraft or another mode of transportation such as the train, cruise ship, etc. It may also be utilised in applications involving monitoring and determining biometrics of a subject at gates, lounges, doors, or restricted areas. Also, although many applications involve the use and determination of facial biometrics, other biometrics (e.g., hand, fingerprint, retinal, etc) may be used or determined. For the sake of simplicity different aspects of the invention will be described in the context of boarding passengers using facial biometrics.

Facial biometric boarding involves capturing one or more facial images from a passenger, and then performing a match between the captured image and a reference passenger database to obtain the passenger data required to board the passenger. Typically, the algorithm will try to capture multiple images and then select the best image from the captured images, and the best image will be used to perform the matching. Such best images, if they are matched to passengers approved for boarding, may be saved in a local or remote memory location to be accessed later. For instance, facial images of the passengers may be captured and processed using the system disclosed herein, upon deplaning or arriving at the gate, to see whether they match any of the saved images which were used for matching purposes at the time of boarding.

In many situations there will be multiple passengers who are instructed to form a queue, so that the biometric boarding can be done for the passengers one at a time by each biometric boarding machine. Doing this as fast as possible, and without introducing errors, is important for both logistic and economic reasons. Aspects and embodiments disclosed herein provide the technical tool which facilitates reducing the boarding time, as will be described in the document.

The invention described herein is suitable for incorporation into biometric boarding or admission applications, to reduce the chances of the biometric applications being unable to resolve between different passengers, often brought on by passengers standing too close to each other. Therefore, the invention can allow a disorderly process where passengers do not need to remain as far apart from each other as in prior art processes, but with the possibility of timeout issues being triggered minimised.

In biometric boarding, the biometric cameras work in such a way that passengers in the field of view of the cameras are "tracked" over time. This is to help reduce the occurrence of error events which necessitate having to repeat the identification and boarding process for passengers. By "tracking" passengers over time, it is also possible to acquire multiple images, so that substandard facial images unsuitable for biometric processing may be discarded. The inventors have noticed that in practice, "good enough" facial images are quickly replaced by "even better" facial images before facial matching occurs. This increases the probability of a good face match and also reduces the probability of a no-match. This saves processing time, as the inventors have noted in trials in which the facial image capture runs at 10-15 frames per second (fps), creating more than enough images for face matching algorithms that typically run at 0.5-5.0 fps.

In a prior application by the inventors disclosed in AU 2019272041, the content of which is incorporated by reference, devices and systems which make use of both two-dimensional (2D) and three-dimensional (3D) data to facilitate biometric boarding are described.

The invention disclosed herein further makes use of 2D and 3D information from the camera system to track subjects. It makes use of discontinuity analysis to resolve tracking identity failures that occur from time to time when passenger spacing is not enforced. In particular, the time series of the tracked passenger history is analysed to detect a particular discontinuous pattern that occurs when there is a tracking failure.

Therefore, in general terms, the invention involves generating a time series of the position data for the tracked passengers (i.e., tracked faces), and determining whether there has been a discontinuity in the tracked position. When a discontinuity has been detected, it is treated as an indicator that an error condition has occurred, e.g., where the biometric boarding system tries to board a passenger who is determined to have already been boarded.

As will be explained, once such an error is detected, it is dealt with by reacquiring the facial image of the subject (in advance of biometric matching) so as to reassign the subject (or tracked object thereon) with a new unique tracking identifier.

The invention aims to solve the problem of a person at a front of a queue leaves the field of view of the biometric camera (i.e., has left to board the aircraft), and another person who is close behind moves into the same spatial area within the field of view that was occupied by the first person.

Possibly, the person at the front of a queue only temporarily leaves the field of view of the biometric camera rather than leaves to board the flight—for example, if they temporarily look away or move away. The biometric camera itself has some occlusion handling, and requires a stable face before tracking begins. Thus if the "look away" is brief, the person standing behind will not be considered a tracked face until a certain amount of time passes, and the person in front will retain their tracking identifier during the occlusion.

However, if the person at the front of a queue disappears from the camera's field of view (e.g., bends to tie their shoelace) for a period of time long enough for a stable face of the person behind to be captured, a discontinuity will be detected, if the person behind is standing closely enough that their face becomes visible in the same spatial area in the camera's field of view. The next face (of the person behind) in the field of view will then be tracked with a new tracker identifier.

In this event, the processing fails, and what would happen is as follows:

while the first, front person is out of view, the second person would be tracked, authenticated and indicated to that they may board. If the front person moves back in view, they typically get a new unique tracker identifier again.

If the front person was already "boarded" on the basis of a biometric authentication of the back (second) person, but returns to the field of view of the camera, the system will tell the passenger that they are "already boarded".

If the front person was "boarded" on the basis of the biometric authentication of the back (second) person, and moves out of the way without returning to the field of view, and the second person walks forward, the system will re-attempt face capture and matching for the second person, and report to the second person that they are "already boarded".

In the hypothetical situation where the back person is in the same spatial position as the front position, and the tracking identifiers do not change, the same discontinuity detector described in this application will result in a new tracking identifier being generated, followed by a generation of a new tracked face, and the passenger will get an "already boarded" notice.

In this way the process integrity is maintained at the expense of transaction time, where the "already boarded" notice will prompt airline/airport personnel to handle the exception.

There are furthermore two extra protections envisaged for biometric boarding processes as follows:
- displaying the seat number on the screen, providing an extra manual check for passengers; and
- there is an agent is at the desk in front of the passengers, who should be trained to spot abnormal scenarios and be able to reset the tracking system if required.

Figure 1:
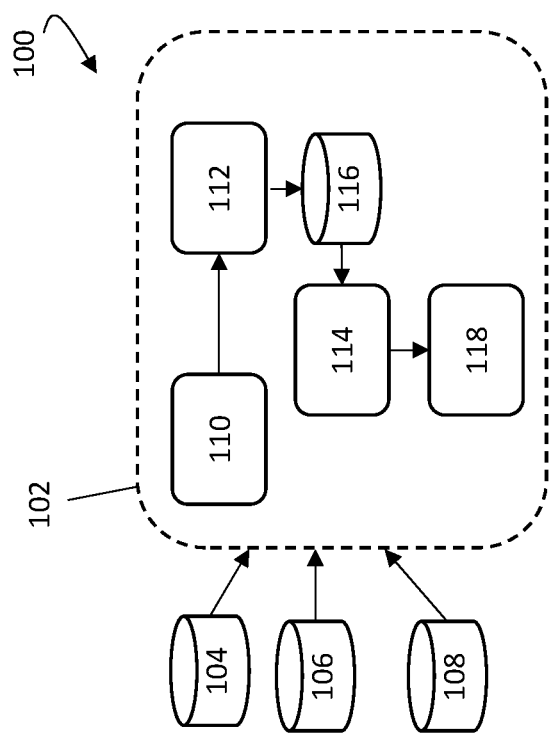
FIG. 1 is a schematic representation of a biometric boarding system in accordance with one embodiment.

Embodiments of the invention will now be described in more detail. FIG. 1 conceptually depicts a biometric boarding system 100 in accordance with one embodiment of the invention. The system 100 is adapted to process biometric data and to control whether a subject is to be boarded. The system 100 includes a processing module 102 which may reside on a computing means located in the device housing the hardware for implementing the system 100, or a server computer.

The processing module 102 is adapted to receive a first data 104, including two-dimensional (2D) images, and also a second data 106 which provides position information of the imaged objects. The two-dimensional images 104 are images of the objects, and the second data 106 providing information regarding the position of the imaged objects in relation to the device which captures the images. In the facial biometric boarding application, the imaged objects are facial images of the subjects.

The second data 106 may be depth (z-axis) information, or it may be three-dimensional (3D) x, y, z position information. The position information may be captured by a three-dimensional (3D) camera. Depending on the specific embodiment, the processing module 102 may also have access to further measurement data 108, such as point cloud data, infrared or laser scanning data.

The processing module 102 includes a detection module 110, a tracking module 112, and a discontinuity analysis module 114. The first data 104 and the second data 106 are continuously acquired at the temporal resolution(s) of the acquisition device(s) and provided to the detection module 110. The detection module 110 is adapted to detect relevant objects, in this case faces, in the incoming image frames. The tracking module 112 is adapted to track the detected faces and record their position over time, to generate a trajectory data 116, being a time series of position data for each of the detected faces.

Each series of image data 104, which is considered as being image data of the same subject, will be provided to the biometric matching module 118. The biometric matching is then performed to find a match in a reference database of passengers, to ascertain the boarding eligibility of the subject being processed. However, prior to the biometric matching occurring in the biometric matching module 118, the system 100 first checks whether there might be an error in the assumption that the series of image data 104 are indeed taken of the same person.

This is done by analysing the trajectory data 116 and ascertaining whether any discontinuity exists in the trajectory 116 of any tracked objects (e.g. faces).

Detection of discontinuity in a tracked list then triggers the system 100 to resolve the identity of the tracked subject associated with the tracked list.

FIG. 2 conceptually depicts one embodiment of the process 200 for generating the trajectories to be analysed. In this embodiment, the first data 104 are image data provided by a high resolution 2D camera, and the second data 106 are image data provided by 3D camera. The two cameras can be used interchangeably or together to gather position data of the tracked objects. In a practical example proposed by the inventors, a 3D camera with a frame rate of 10 to 20 frames per second provides the z-axis (and optionally the x- and y-axes) information to the processing module 102 and when the object is determined to be in a correct orientation, a higher-resolution 2D camera takes the static image(s) of the object that will be used for the biometric matching in the biometric matching module 118. Strict synchronisation of the 2D camera and the 3D camera is not required because the face position (from the camera perspective) remains relatively constant despite small movements of the passenger. One constraint is that the sampling rates of the cameras need to be high enough such that the movements of the passenger do not result in an incorrect position measurement. Practical experiments have found that a lower limit of sampling rate is around 5 fps.

At step 202, an object detection algorithm is applied to each frame of high-resolution 2D image data 104, constrained to 3D regions computed using the 3D image data 106 that was determined as containing objects. The co-registration of 2D object detection data with 3D data provides 3D positional information of the object—here the facial—region. This generates a list of high-resolution images of the detected objects (e.g. high-resolution facial images) and their position at each time instant.

At step 204, the position information is logged to be provided to the tracking module in step 206. There are several ways in which the position information may be logged. A series of images extracted from the 3D image data may be logged, the tracking module then analysing the images and determining a trajectory of movement of the object image in the series of images, for example by analysing relative pixel displacement of the object image. Alternatively, the 2D camera may be triggered to take images at regular intervals and/or upon real-time analysis of the 3D images when it is determined that some movement has occurred. Thus, the stored data may be 3D images, 2D images or simply position information of specific features of the images, or a combination of the above. The stored data may be any data relating to the images that can be used for tracking movement in the series of images.

At step 206, the data at t=tn are provided to the tracking module 112 to update the tracked data 206, to generate the tracked list of objects (faces) with trajectories 208.

In step 208, the tracked list of objects with trajectories 116 will be provided to the discontinuity analysis module 114. Typically, especially in scenarios where the subjects (passengers) are in a single file queue, there will be one tracked list. The discontinuity analysis module 114 determines whether there has been a discontinuity in any of the trajectories, and de-stack the object if required. The detection of discontinuity may be based on the change between data samples meeting or exceeding a threshold, or on another statistical property in the data, such as a detected velocity or singularity. This avoids the biometric boarding system stalling due to the confusion in the identity of the subject.

Figure 3:
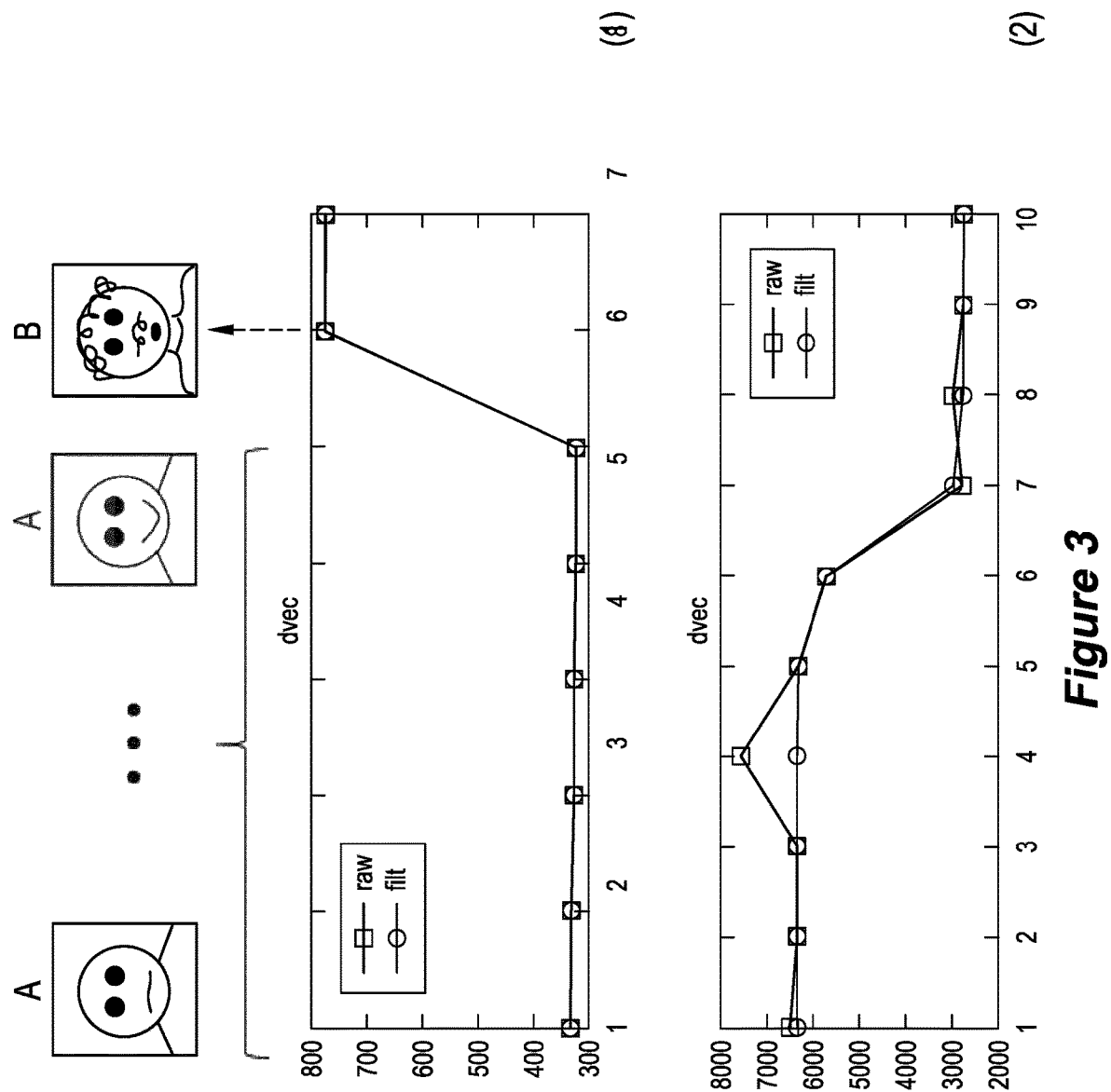
FIG. 3(1) is an example of a depth history of a tracked object, containing a discontinuity.

FIG. 3(1) illustrates an example depth history of a tracked object, containing a discontinuity. The horizontal axis shows a series of time, from t=t1 to t=t8. The vertical axis shows the depth information in relation to the facial images acquired at t=t1 to t8, computed from the trajectory. The depth information is the distance (measured in millimetres, or "mm") of the object from the image capture device at each time instance at which an image is acquired. From the first time frame or instance (t=t1) to the sixth time frame (t=t6), there is a gradual decrease in the distance as the subject A walks toward the image capture device. Subject A is biometrically matched to the passenger list (a unique tracker identifier is created for Subject A as described above) and Subject A turns to walk away at t=t7. Subject B is standing close behind Subject A and is now visible in the field of view (FOV) of the image capture device, before Subject A has fully left the FOV. The image capture device therefore acquires a blurred image of Subject A turning away, and also a facial image of Subject B. The system then treats the image of Subject B as that of Subject A. The captured data in relation to Subject B is now included in the same tracked trajectory as Subject A. However, because Subject B is standing some distance behind subject A, the distance data jumps from about 330 mm at t=t6 to about 770 mm at t=t7. The discontinuity in the tracked trajectory is logged as occurring at t=t7. A notification is generated that indicates that a new object is likely to be in the FOV of the image capture device now and the image processing begins again to create a new tracker identifier for Subject B, no longer treating the image of Subject B as that of Subject A, but recognising it as that of a new object.

FIG. 3(2) shows the history of facial area sizes, calculated from the tracked face in each image sample in a series of images included in the tracked data. The horizontal axis shows a series of time, from t=t1 to t=t10. The vertical axis shows the sizes of the facial area (measured in millimetres squared, or "$mm^2$"). The raw calculated facial area data points are represented by the squares. The circles represent data points which result from applying a filter to the raw data, for example to smooth the data and remove inconsequential discontinuities (e.g. those below a variance threshold). At t=t6, there is a slight reduction in the facial area of the detected image to roughly 5800 $mm^2$ from about 6300 $mm^2$. This reduction is small enough that it does not trigger a declaration of there being a discontinuity. The small reduction could be attributed to the target passenger's movement, between t=t5 and t=t6. However, at t=t7, there is a larger reduction of the facial area in the detected images to about 2000 $mm^2$, which is larger than the expected change (i.e., a threshold) in the size of the facial area for the same person. Therefore, at t=t7, a discontinuity in the size of the facial area is detected. FIG. 3(2) therefore shows an example where the discontinuity at t=t7, which corroborates with the trajectory data shown in FIG. 3(1), is also (or alternatively) confirmed using the detection of a discontinuity in the facial area.

The threshold of the amount of change in the facial area size required for a discontinuity to be detected may be determined using a number of factors, such as statistics regarding facial sizing, the expected moving speed and the sampling rate (i.e., expected time lapse between two image samples).

Figures 4, 5:
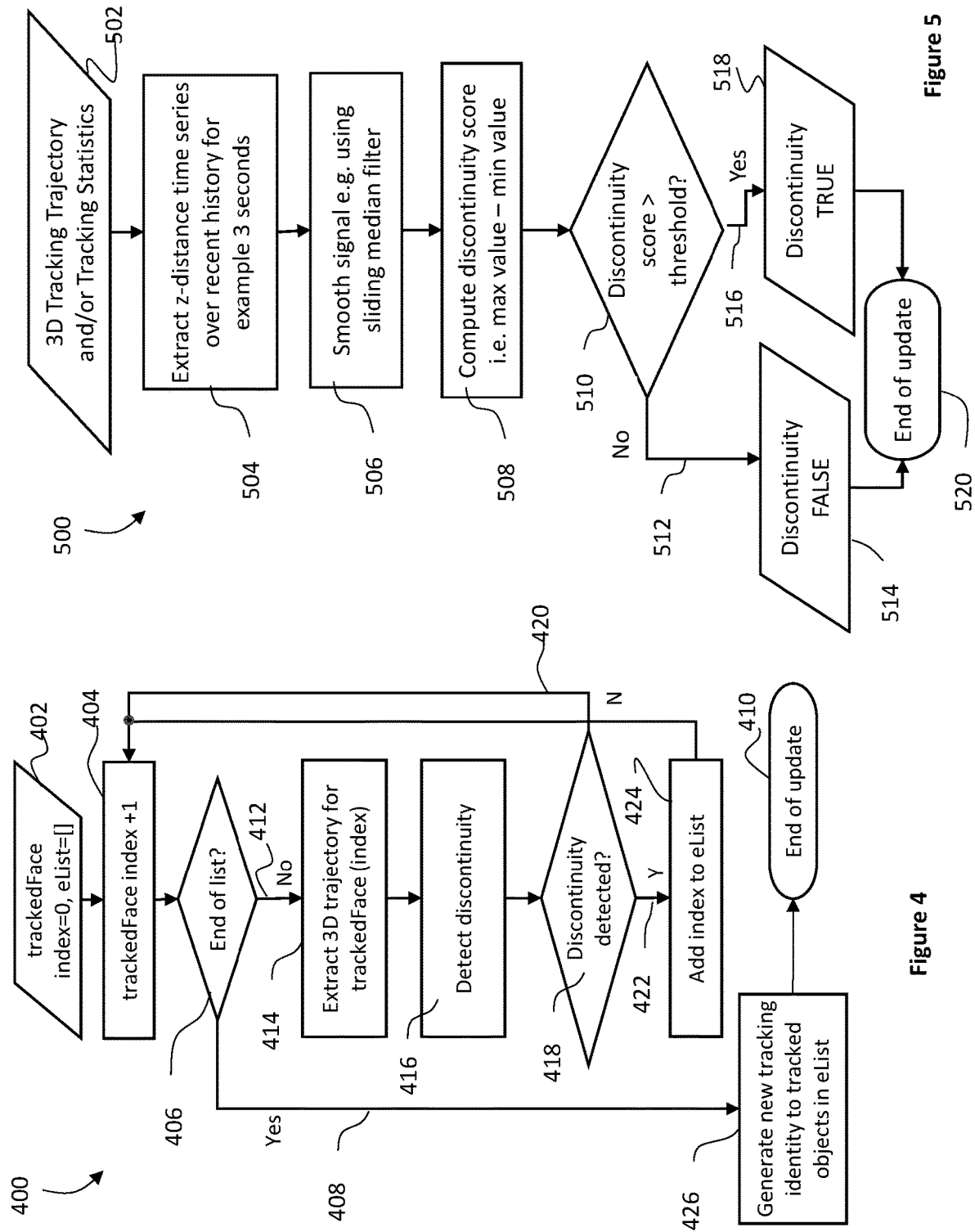
FIG. 4 schematically depicts an example of the process employed by the discontinuity analysis module.
FIG. 5 schematically depicts an example discontinuity detection algorithm.

FIG. 4 schematically depicts an example of the process 400 employed by the discontinuity analysis module 114. At the beginning of the process 400, the system has not detected any discontinuity, and none of the tracked lists have been processed (stage 402). At this stage, each tracked list is assumed to include a series of image data and trajectory in relation to the same subject, and has one unique tracking identifier assigned to it.

The discontinuity analysis module 114 will process (406) each tracked list in turn (404), to detect if there are discontinuities in the tracked lists. As explained, the detected discontinuity is an indication of a stacking error, requiring de-stacking of a subject by assigning a new unique tracking identifier to the subject.

If there is no tracked list available or the system has processed all of the available tracked lists without detecting discontinuities (408), the discontinuity analysis module 114 ends its processing (410) without assigning a new unique tracking identifier to any of the tracked objects (426).

If there is at least one tracked list available (412), the system processes the next available list by extracting its trajectory (step 414), in order to determine the change in 3D position over time. The trajectory is analysed by a discontinuity detection algorithm (416), to detect the presence of discontinuity in the data (418). The discontinuity may be in the trajectory of the tracked object, or another statistic or metric in relation to the tracked object, or a combination.

If no discontinuity is detected (420), the system processes the next tracked list (404). If a discontinuity is detected (422), that tracked list will be added to a record (424). The record is provided to store data in relation to any tracked objects in respect to which discontinuity has been detected. The record could be a database or a linked list, or it could have another data structure. The system then goes on to process the next tracked list (404).

Where there is no more tracked list to process (408), the system will check the aforementioned record to see if any of the processed lists have been ascertained to be of tracked objects whose data contain discontinuity. Each tracked object included in the record will have a new tracking identifier assigned to it, to resolve the ambiguity in the identity of the tracked object. The new tracking identifier will differ from tracking identifiers associated with any previously boarded passengers.

In preferred embodiments, assignment of a new tracking identifier to a tracked object will also trigger the image capture device to capture new images of the tracked object. Those new images will be associated with the newly assigned tracking identifier and passed to the biometric matching module 118 (see FIG. 1).

In the context of biometric boarding, the system now recognises that the newly assigned tracking identifier has not been biometrically matched to any subject in the reference list, and can perform the matching to allow or deny boarding by the tracked subject.

FIG. 5 schematically depicts an example discontinuity detection algorithm (500). At step 502, the discontinuity detection algorithm receives as an input, the trajectory obtained from a tracked list. In this particular embodiment, the algorithm is provided to assess discontinuity in the time series of depth data associated with the acquired images. Therefore, at step 504, the time series of depth data is determined or extracted from the trajectory. The amount of data extracted may be confined to a recent history, e.g., the most recent period of time. The period may be a number of seconds, e.g., 3 seconds.

At step 506, the data determined from step 504 is smoothed, by applying a filter. This may be done to smooth out the influence from noise, but it is not a required step. If this step is included, then the filter applied is preferably one which is suited for retaining the discontinuity which would be expected to be a high frequency component in the signal. Thus, the filter may need to be designed specifically to suit the type of signal processed while retaining the ability to detect discontinuity.

At step 508, a disparity score or discontinuity score is calculated at each time sample. This could simply involve a calculation of the difference between the data between two consecutive time samples. At step 510, the algorithm determines whether the disparity score meets a discontinuity condition. The determination may be based on a threshold, where the algorithm determines a discontinuity has occurred if the disparity score meets a discontinuity condition, which could be that it exceeds a threshold, or alternatively if the disparity score at least equals a threshold. For example, the computation at steps 508 and 510 could look like:

$\Delta t_n = Xt_n - Xt_{n-1}$, where $\Delta t_n$ is the disparity score at time $t=t_n$, $Xt$ is the value of the data sample at time $t$, and $Xt_{n-1}$ is the value of the data sample at time $t=t_{n-1}$.

The discontinuity condition at time $t_n$ is met if $\Delta t_n \geq$ threshold.

The threshold may depend on the expected noise range in the data, or the expected amount of positional change in the person's position between two or more image frames (and thus dependent on the camera's frame rate), or a combination of both.

Furthermore, the threshold may be some factor of—or have a minimum of—the average depth of a person's head, knowing that a second person in a queue is extremely unlikely to be less than the depth of the first person's head behind them.

An alternative discontinuity condition could be the rate of change of distance z (i.e., velocity or speed). If the sampling rate/frame rate of the 3D camera is measured in time samples tn, a rate of change of distance z that is greater than, say, 120 mm per frame or 120 mm/s or some other appropriate value, could mean that there is a discontinuity.

If the discontinuity condition is met (516), then the algorithm outputs a result to indicate discontinuity is detected in the tracked data (518). If the discontinuity condition is not met (512), then the algorithm outputs a result to indicate no discontinuity is detected in the tracked data (514). The algorithm at this point ends (520) for the just processed tracked list.

The above algorithm may also be used to detect discontinuity in information other than depth data, depending on the input provided to the discontinuity detection algorithm. For instance, provided the algorithm receives as an input the 2D images, the algorithm may determine an area of the detected object in each of the 2D images (e.g., facial area sizes in FIG. 3(2)) in the tracked list, and detect discontinuity in the time series of area by detecting if the size of the area abruptly changes between samples. The areas may instead already be calculated and then provided to the algorithm as input. For instance, the discontinuity condition may be whether the change is outside of the expected amount of variation due to the change in position expected in the frame rate, data noise, or slight changes due to an expected range of movement by the subject.

As another example, the algorithm may receive as an input, a biometric score calculated for each image in the tracked list, or the algorithm may be configured to determine the score if it receives the images as input. The algorithm can then determine whether there is a discontinuity in the time series of biometric scores.

Doing so compares the similarity of the captured facial images and detects when one sample is not sufficiently similar to the preceding sample. For instance, the discontinuity condition may be whether the change between two consecutive data samples is outside of the expected amount of variation, noise or other tolerable intra-subject variability.

Thus, more generally, the discontinuity determination algorithm may be used to determine discontinuity in the trajectory, depth, or other statistics associated with the images included in the tracked list.

In the above embodiments, tracked objects are assigned new unique tracking identifiers if their trajectories are determined to contain discontinuity.

However, in further embodiments, the discontinuity may instead be determined on the basis of other statistics or metrics in relation to the captured images, such as object area, or facial biometrics if the objects captured are faces.

In further embodiments, a combination of detecting discontinuity in the trajectory and detecting discontinuity in other statistics or metrics may be used. For instance, the discontinuity algorithm may be required to check that discontinuity conditions for both the trajectory and the size of the object area (e.g., the depth of the tracked face, and the size of the tracked face) are met for a tracked object, in order to declare there to be a discontinuity in respect of the tracked object. That is, in some embodiments, the system may apply multi-modal constraints in its discontinuity detection algorithm. The system may, as a primary condition, check that the discontinuity condition for the trajectory is met, and then check whether one or more discontinuity conditions in respect of other metrics or statistics are met, before declaring that a discontinuity in relation to the tracked object exists.

FIG. 6 schematically depicts a biometric boarding device 600. The biometric boarding device 600 includes a processing device 602, which may be a central processing unit or another processor, configured to execute machine instructions to implement the system of one or more of the above described embodiments. The machine instructions may be stored in a memory device 604 co-located with the processing device 602, or they may be partially or wholly residing in one or more remote memory locations accessible by the processing device 602. The processing device 602 also has access to data storage 606 adapted to contain the data to be processed, and possibly to at least temporarily store results from the processing.

There may also be a communication module 608 so that the device may access data provided wirelessly, or communicate data or results to a remote location, e.g., a computer at a monitoring station or cloud storage 613, over a communication network 612.

The box 610 conceptually signifies that the components therein may be provided in the same physical device or housing. The box 610 is shown in dashed lines, to represent that one or more the components may instead be located separately, or that other components (such as image capture equipment, or input and/or output equipment) may also be physically included in the same device, or both.

The processing device 602 is in communication, being either wired or wireless communication, with a data capture arrangement 614 to capture data required for the processing.

As alluded to before in relation to the system modules, in preferred embodiments for facial biometric boarding, the data capture arrangement 614 is configured to capture the 2D images of high enough resolution to enable facial recognition, and also 3D images so as to provide trajectory data.

FIG. 7 shows an example "pod" type boarding device 700. It should be noted that this is an example illustration only, and the invention may be embodied in other types of devices. The device may also generally have different physical forms or have different hardware requirements depending on specific purpose (e.g., in the context of an airport—bag drop or check-in, customs control, boarding) for which the device is provided.

The boarding device 700 includes a device housing 702 and a biometric system 704. The biometric system 704 comprises a first image capture device 706 and a second image capture device 708. The first image capture device 706 may be in the form of a depth camera or a stereoscopic 3D camera. The second image capture device 708 may be in the form of a high resolution 2D camera. A display 710 may also be included.

Optionally, a laser projector or infrared (IR) sensor/emitter 712 is provided in the biometric system 704 or elsewhere within the device 700. The laser projector or IR sensor/emitter may optionally be disposed behind the display 710.

A set of illumination means or lights 714 may be mounted on the front face 701 of the device 700. A laser projector or point cloud generation device (not shown) to assist with mapping and detection of subjects may also be provided. Optionally, the device 700 may be a portable device which can be used to determine the identities of persons. The point cloud generation device projects a cloud or plurality of light-based dot points (including but not limited to infrared LED projected dots) onto the upper torso region of the user or passenger for purposes of region-of-interest detection, biometric analysis and facial topographic mapping by the system. If the point cloud generation device is included, data from the point cloud generation device will also be provided to the biometric system and the biometric analysis or topographic mapping data may also be used in the discontinuity analysis.

Embodiments described herein therefore each provide a system which can facilitate disorderly boarding, i.e., where the subjects (passengers) do not strictly adhere to the distance separation required of an orderly boarding process. The tracking process also allows the system to maintain separate tracking identifiers in a group of passengers despite small occlusions or motion-blur that may occur in the images.

The described system therefore allows for a minimisation of the amount of biometric processing that needs to be done, by only sending good images of subjects with unique tracking identifiers, and not confusing them with neighbours. It should be noted that while such confusion does not occur often, even a small percentage of such occurrence will cause large outliers in the data (time required to board passengers), because of additional processing steps required to retry or manually process the passengers.

The function of the system involving using discontinuity in the trajectory of a tracked subject (or more precisely, tracked objects), which occurs because there is an inherent physical distance between two people that can be measured, is contingent on the sampling rate being fast enough. Therefore, the ability of the system to resolve the confusion between two subjects that are physically too close together, will also depend on the sampling rate. A higher sampling rate will enable the system to resolve between subjects that are closer together.

The described system therefore provides the technical advantage over known systems, where there is a need to control the boarding process by making use of trained staff or signage processes, to ensure spacing is enforced, and potentially also software to minimise unnecessary identification and Departure Control System transactions.

In the prior art, to minimize the stacking problem, the biometric cameras are sometimes placed at an angle to the queue of passengers or customers, and each passenger is required to turn away from the queue direction and walk or otherwise move up to the camera, to minimise the potential of confusion with the faces of the other passengers in the queue. However, requiring each passenger to turn to face the camera incurs a time cost. In contrast, the present system, as described, is designed to minimise the stacking errors using discontinuity detection rather than the angular placement of the camera in relation to the queue.

Figure 8:
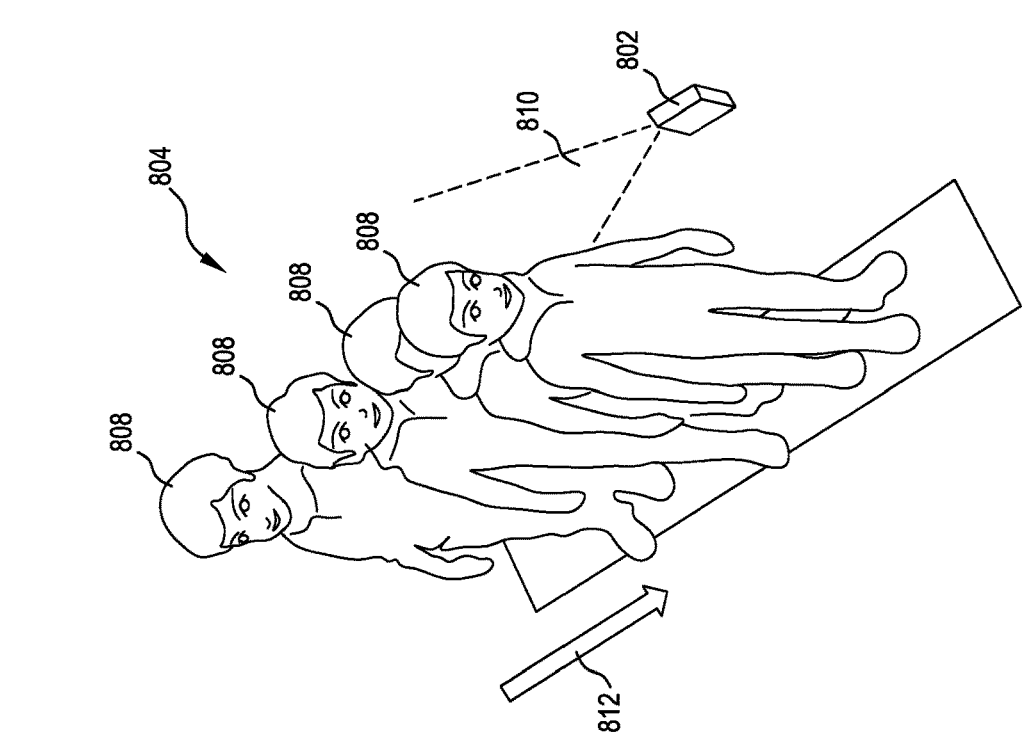
FIG. 8 depicts a boarding queue where the camera is placed directly in front of the queue.

As the solution provided by the present system does not require such an angled placement, the camera for the present system can be placed directly in front of the queue of passengers lining up for boarding. FIG. 8 depicts this direct placement which the skilled person would understand to be enabled by the system described herein with reference to FIGS. 1 to 7. As shown in FIG. 8, the camera 802 (i.e., data capture arrangement) is placed directly in front of the queue of passengers 804, so that the passenger being processed 806 does not need to turn away from the direction of the queue (arrow 812) in order to enter the field of view 810 of the camera 802. While the other passengers 808 waiting in queue 804 may also face the camera 802 as they move or wait, the system will be able to handle the detection of another face in the field of view 810, using the discontinuity detection algorithm to resolve stacking errors if required.

The system may provide an interface, which may be a graphical user interface, for being displayed on a screen and for viewing by the passengers, e.g., to provide boarding instructions. An interface may also be provided on another display device for viewing by a staff member, for monitoring a live boarding process, reviewing a completed boarding process, or for another purpose such as training. The interface shown to the staff may completely or partially mirror that (if any) shown to the passenger. It may include interface portions to display other data which are not shown to the passengers, such as one or more of the following non-limiting examples: passenger trajectory, values of particular metrics being monitored to detect discontinuity, unique tracking identifiers, or statistics such as the number of people who have boarded, current average or total elapsed processing time, rate of successful processing and boarding.

Figure 9:
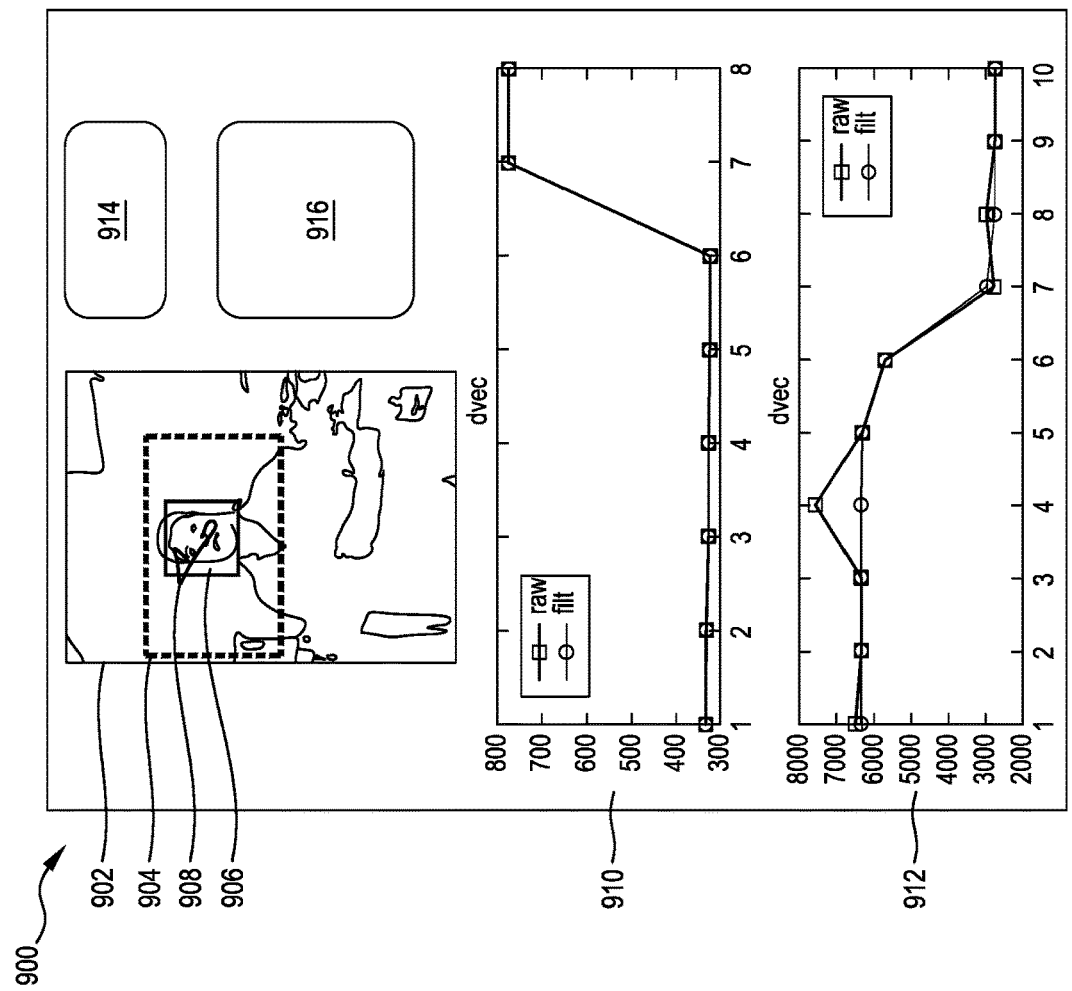
FIG. 9 depicts an example interface provided by the system.

FIG. 9 depicts an example interface 900. The interface 900 includes a first display field 902 which may, at particular times or at all times, show the image of the passenger who is being processed, captured by the camera. The first display field 902 may mirror the interface (see FIG. 10) which is shown to the passenger, in which case the display field 902 can also display instructions, which may be in the form of text or graphics (e.g., animations), to the passengers.

In FIG. 9, the first display field 902 is showing an image of the passenger. Box 904 (dotted lines) marks the image area which is being processed by the algorithm to detect the presence of faces. Box 906 marks the image area where a face is detected. In this example, the system tracks the position of the centre of the detected face and displays the trajectory 908 of the tracked face. In some embodiments, the trajectory 908 will be displayed in different colours or visual styles depending on the operation of the access control system. For example, the trajectory 908 can be displayed in a default colour or style when tracking of a subject begins. However when the system detects a discrepancy in the tracking identifier associated with the trajectory—that is, a discontinuity has been detected—it will change to a different colour or style to provide a visual indication of the error.

The interface 900 may display a time series 910 of the 3-dimensional position, or the depth of the tracked face (i.e., distance to the camera). Additionally or alternatively, the interface 900 may display at least one other time series 912, being time series of the values of another metric (such as facial area size) determined over a period of time, if the algorithm is checking for discontinuity in the values for that metric.

An alert display or alert field 914 may be included to display an alert when the algorithm detects an error. The interface 900 may include one or more data display areas 916, which could be in the form of display portions, windows, or access fields or buttons, for displaying or providing access to particular data. The data display 916 may be a passenger identifier display showing the unique tracking identifier of the passenger currently being processed. The data display 916 may also provide statistics regarding the individual, total, or average processing time for the passengers.

The above portions of the interface may not all be provided at the same time. For instance, from a dashboard, a user (e.g., airport staff or system developer) can be enabled to select which interface portions to include for showing on the device screen.

Figure 10:
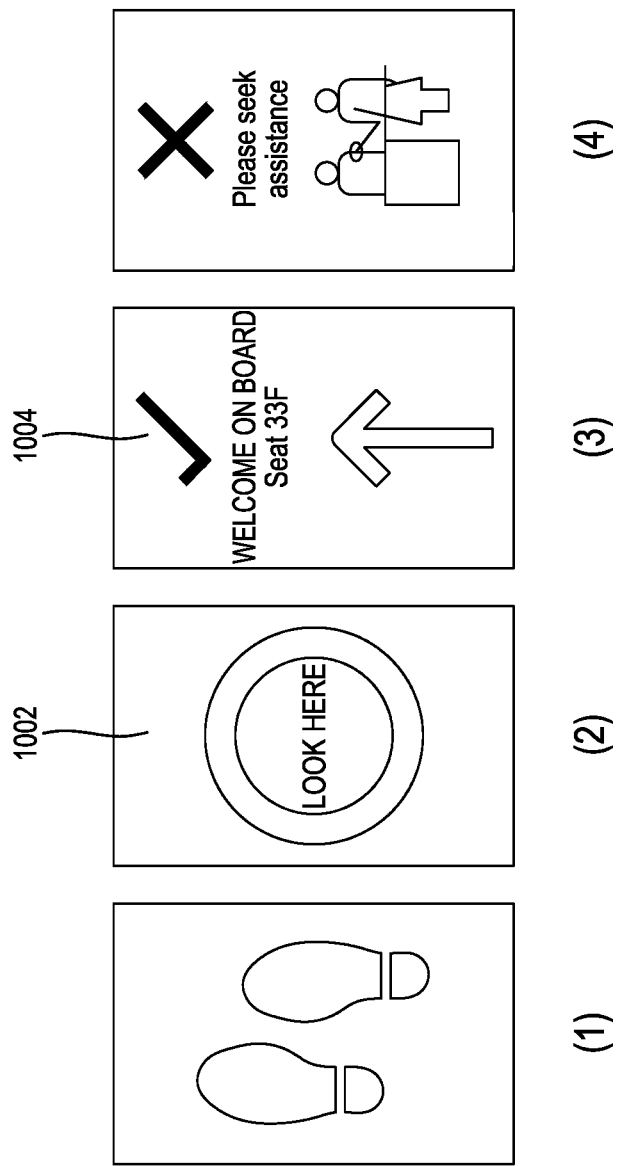
FIGS. 10 (1) to (4) depict example displays which may be shown on a passenger interface.

FIGS. 10(1) to 10(4) depict various displays which may be shown on a passenger interface for viewing by the passengers. FIG. 10(1) shows a screen from an instruction for the passenger to walk toward the camera. FIG. 10(2) shows a progress screen which directs the passenger to look at the biometric camera while his or her photograph is being taken. The camera view of the passenger may be shown inside the progress circle 1002. FIG. 10(3) shows a screen which confirms that the passenger has been matched and invites the passenger to board. A seat number 1004 is shown, and this provides the passenger an opportunity to check that it matches with his or her assigned or selected seating as shown on the boarding pass. Other information such as the passenger's name could also be shown for verification purposes. FIG. 10(4) shows a screen which is displayed when the biometric boarding process cannot board the passenger for any reason, showing instruction to direct the passenger to seek assistance from the staff.

The disclosed embodiments therefore aim to make a positive improvement in the transaction time by facilitating a disorderly boarding process.

It will be appreciated that the above described system is not restricted to being deployed at boarding. It can instead or also be used at another check point (such as an exit) of premises, or a vehicle or mode of transport. A premise with multiple exit or entry points may have separate devices (be they "pod" type devices or take other forms) which each implement an instance of the above described process.

It should be further noted that the identification aspects of the above described process and system may be omitted or disabled, in applications where the actual identities of the individuals entering or leaving an area are not checked, and rather it is the number of persons in the area that is tracked. By looking at how many different "tracking identifiers" there are, the process is able to determine the number of different people who, from an orderly or "disorderly" queue, have been processed to enter an area, leave an area, or generally move past a checkpoint.

For instance, a device embodying the above described system, which has been used to board passengers onto an aircraft, can be used again at an exit check point to "deplane" the passengers. Processing of deboarding passengers may include having the passengers form a queue to be again processed by the system. New images of the passengers acquired at the processing checkpoint may be matched to a passenger database. The passenger database may be a reference database comprising the "best images" that had been acquired while the passengers were being processed by the boarding system, and that had been chosen to biometrically match and then board the passengers. The "best images" reference data may have been saved locally to the device, so that the biometric matching of the newly acquired images and the "best images" references can be conducted even when there is no connectivity with a central passenger reference database.

The device could have its biometric identification module entirely disabled, to simply count the number of different passengers who have deboarded or moved past an exit checkpoint (e.g., at the gate, or another restricted arrivals area in the airport). In this case, an alarm may be raised if the number of people who have arrived from an aircraft differs from the number of people who originally boarded the aircraft.

Variations and modifications may be made to the parts previously described without departing from the spirit or ambit of the disclosure. For instance, in the above, embodiments that utilise biometric matching determine whether to allow access or admit passage by a subject (e.g., passenger), by checking to see if there is a match between the subject and a reference database. However, the same inventive concept could be applied in situations where the system determines when to deny access or passage. For example, the system would still use the same discontinuity detection to try to reduce the stacking error. However, the biometric matching module can try to match the image of the passenger or subject being processed with a "no access" list, and deny access by that passage or subject if a match is found on the list. By only counting those unique identifiers that have been assigned to the subjects (or "faces" in the case of facial recognition) who are allowed access or who have gamed access, the system can keep track of how many subjects have been admitted.

As described above, the system requires 2D images of high enough resolution for facial or object detection, along with position data to track the detected face (or object). While the use of two capture devices is described in embodiments, this does not form a requirement which constrains the spirit and scope of the invention. For example, the same inventive concept will still be satisfied if both the 2D image data and the spatial position data come from a 3D camera, provided the 3D camera is able to capture images in high enough resolution to allow facial or object detection and matching—and the method which is implemented by the system would still work in the same way.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A facial biometric access method for controlling access for at least one tracked subject, each tracked subject having an associated unique tracking identifier, comprising:
   acquiring or receiving a series of two-dimensional images of a facial area of a first tracked subject in a field of view of an image capture device, wherein the first tracked subject relates to a first person being in front of a queue and is assigned a first unique tracking identifier;
   providing trajectory data of the facial areas of the first tracked subject from a plurality of position data, each associated with one image of the series of two-dimensional images;
   determining if there is a discontinuity in the trajectory by analyzing the trajectory data, and if a discontinuity is detected, reacquiring a new series of two-dimensional images of a facial area of a second tracked subject in the field of view of the image capture device, wherein the second tracked subject relates to a second person being now in front of the queue, the first and second person being the same or different, and assigning a second unique tracking identifier to the second tracked subject; and determining whether access should be allowed based on the second unique tracking identifier and a match between a reference database of subjects and at least one image from the new series of two-dimensional images if discontinuity is detected, or based on the first unique tracking identifier and a match between the reference database of subjects and at least one image from the series of two-dimensional images if discontinuity is not detected.

2. The method of claim 1, wherein the step of determining if there is discontinuity comprises determining if a distance discontinuity condition or a velocity discontinuity condition is met by a time series of distance data or velocity data obtained from the trajectory.

3. The method of claim 2, wherein the discontinuity condition is whether a difference between two data samples in the time series: 1) exceeds a threshold value, or 2) exceeds or equals a threshold value.

4. The method of claim 3, wherein the threshold at least in part depends on an elapsed time between times at which the two data samples were acquired.

5. The method of claim 1, further comprising providing a time series of a statistic or metric computed from the trajectory or the two-dimensional images, and determining whether a statistic or metric discontinuity condition is met by the time series of statistics or metrics.

6. The method of claim 5, further comprising further checking whether the statistic or metric discontinuity condition is met before determining if there is a discontinuity in the trajectory or data computed from the trajectory.

7. The method of claim 1, further comprising applying an object detection algorithm to a three-dimensional image to detect one or more objects, each object being said one of said at least one tracked object.

8. The method of claim 1, wherein the position data comprises at least depth data.

9. The method of claim 1, wherein a discontinuity is detected if the position of the facial area of the second tracked subject is behind an expected depth in the position of the first tracked subject.

10. A biometric access control method, comprising the method of claim 1.

11. The method of claim 10, being a facial biometric control method, wherein said at least one tracked object is a facial area of a person.

12. The method of claim 11, wherein a statistic or metric is a facial area size or a biometric score computed from the two-dimensional images.

13. A method of controlling or monitoring access to a premise or mode of transport having one or more entry points, or one or more exit points, or both, comprising implementing the method of claim 1 at least one of the entry points, at least one of the exit points, or both.

14. A non-transitory computer readable medium having stored thereon machine readable instructions, which when executed are adapted to perform the method of claim 1.

15. An access control system, comprising a processor configured to execute machine readable instructions, which when executed are adapted to perform the method of claim 1.

16. The system of claim 15, further comprising an image capture arrangement, the arrangement comprising a two-dimensional image-capturing camera and a three-dimensional image-capturing camera.

17. The system of claim 16, wherein, in use, the image capture arrangement is positioned directly in front of a queue of subjects to be processed by the access control system.

* * * * *